(12) United States Patent
Feng et al.

(10) Patent No.: US 10,279,528 B2
(45) Date of Patent: May 7, 2019

(54) HIGH ADHESION COMPOSITE FILM AND MANUFACTURING METHOD THEREOF

(71) Applicant: San Fang Chemical Industry Co., Ltd., Kaohsiung (TW)

(72) Inventors: Chung-Chih Feng, Kaohsiung (TW); Chih-Yi Lin, Kaohsiung (TW); Kao-Lung Yang, Kaohsiung (TW); Song-Bo Lin, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 110 days.

(21) Appl. No.: 14/796,434

(22) Filed: Jul. 10, 2015

(65) Prior Publication Data
US 2016/0122595 A1    May 5, 2016

(30) Foreign Application Priority Data

Oct. 29, 2014    (TW) .............................. 103137319 A

(51) Int. Cl.
*B29C 47/06*    (2006.01)
*A43B 9/12*    (2006.01)
(Continued)

(52) U.S. Cl.
CPC ................ *B29C 47/06* (2013.01); *A43B 9/12* (2013.01); *B29C 47/0021* (2013.01);
(Continued)

(58) Field of Classification Search
None
See application file for complete search history.

(56) References Cited

U.S. PATENT DOCUMENTS

| 8,021,995 B2 * | 9/2011 | Suzuki | D04H 3/14 156/167 |
| 2003/0022575 A1 * | 1/2003 | Yoneda | A43B 1/00 442/104 |

(Continued)

FOREIGN PATENT DOCUMENTS

| CN | 103571364 A | 2/2014 |
| CN | 104053738 A | 9/2014 |
| TW | 201325894 A1 | 7/2013 |

OTHER PUBLICATIONS

Office action dated May 13, 2015 for the corresponding Taiwan Patent Application No. 103137319.
(Continued)

*Primary Examiner* — Frank D Ducheneaux
(74) *Attorney, Agent, or Firm* — WPAT, P.C., Intellectual Property Attorneys; Anthony King

(57) ABSTRACT

A high adhesion composite film includes a thermoplastic elastomer layer and a modified adhesive layer. The thermoplastic elastomer layer includes a first surface and a second surface, and the second surface is opposite to the first surface. The modified adhesive layer is disposed on the first surface of the thermoplastic elastomer layer. By this way, the adhesion strength of the composite film can be enhanced significantly. Furthermore, the present disclosure can manufacture the high adhesion composite film without the use of solvents, which meets the requirements of environmental protection.

7 Claims, 3 Drawing Sheets

(51) Int. Cl.
  C09J 7/22    (2018.01)
  C09J 7/35    (2018.01)
  C09J 175/04  (2006.01)
  B29C 47/00   (2006.01)
  B29C 47/02   (2006.01)
  B29C 47/14   (2006.01)
  B29K 75/00   (2006.01)
  B29K 21/00   (2006.01)

(52) U.S. Cl.
  CPC ........ *B29C 47/0064* (2013.01); *B29C 47/025* (2013.01); *B29C 47/065* (2013.01); *B29C 47/14* (2013.01); *C09J 7/22* (2018.01); *C09J 7/35* (2018.01); *C09J 175/04* (2013.01); *B29K 2021/003* (2013.01); *B29K 2075/00* (2013.01); *C09J 2201/122* (2013.01); *C09J 2415/00* (2013.01); *C09J 2421/006* (2013.01); *C09J 2467/006* (2013.01); *C09J 2475/00* (2013.01); *C09J 2475/006* (2013.01)

(56) References Cited

U.S. PATENT DOCUMENTS

| | | | |
|---|---|---|---|
| 2005/0158561 A1* | 7/2005 | Wang | B32B 27/08 428/423.1 |
| 2010/0124631 A1* | 5/2010 | Horio | G02B 1/105 428/142 |
| 2010/0255255 A1* | 10/2010 | Kawakami | A61F 13/49413 428/156 |
| 2013/0052461 A1* | 2/2013 | Muta | C09J 7/0282 428/355 N |
| 2013/0164514 A1* | 6/2013 | Yu | B32B 7/12 428/216 |
| 2015/0045489 A1* | 2/2015 | Takenaka | C09J 123/26 524/271 |

OTHER PUBLICATIONS

Search Report dated May 13, 2015 for the corresponding Taiwan Patent Application No. 103137319.
English abstract translation of the Search Report dated May 13, 2015 for the corresponding Taiwan Patent Application No. 103137319.
English Abstract Translation of CN103571364A.
English Abstract Translation of CN104053738A.
English translation of the search report dated Jul. 3, 2018 by SIPO for the corresponding CN Patent Application No. 201510123077.2.
Search report dated Jul. 3, 2018 by SIPO for the corresponding CN Patent Application No. 201510123077.2.
Office Action dated Jul. 3, 2018 by SIPO for the corresponding CN Patent Application No. 201510123077.2.

\* cited by examiner

HIGH ADHESION COMPOSITE FILM AND MANUFACTURING METHOD THEREOF

FIELD

The disclosure relates to a composite film and manufacturing method thereof, more particular to a high adhesion composite film and manufacturing method thereof.

BACKGROUND

Organic solvents are used in the manufacturing process of conventional composite films. Although the organic solvents are recyclable, the setup cost of recycling equipment is very high, and it is quite difficult to reach a recovery rate of 100%. Thus, it is difficult to achieve zero detection of the organic solvents, which does not meet the requirements of environmental protection. In addition, the manufacturing process of conventional composite films is complicated, which easily leads to energy consumption. Moreover, the adhesion strength of the composite films made by the conventional manufacturing process is generally poor.

The conventional composite film and manufacturing method thereof are analyzed in the following patent documents in the prior art.

1. TW Patent Applicant No. 087109330

Approach: "uncured rubber base material" and "semi-finished EVA shoes" are laminated by using toluene and a cleaning agent, and then they are laid aside, heated, ripened and cooled.

Disadvantage: organic solvents that harm the earth environment are used in the method, and the production process is complicated and long, and is uneconomic.

2. TW Patent Applicant No. 087117457

Approach: an adhesive is used to bond soles and heels.

Disadvantage: the adhesive contains organic solvents, which may affect the environment.

3. TW Patent Applicant No. 094111508

Approach: a cross-linking agent remaining on an upper layer of a rubber decorative piece and an outsole blank (EVA foamed material) are bonded for formation through a cross-linking reaction.

Disadvantage: the cross-linking agent belongs to organic solvents, and may harm the environment.

4. TW Patent Applicant No. 101215489

Approach: in a fixing structure of steel-toed shoes, shoe uppers and outsoles are fixed to each other through riveting with inverted-U-shaped nails.

Disadvantage: no other manners are provided to enhance fixing of the metal. As inner sides of the steel-toed shoes only had metal and are not protected by other materials, resulting in that socks quickly wore out and cause a toe injure and so on.

5. TW Patent Applicant No. 099104504

Approach: a TPR (thermoplastic rubber membrane) of 400 to 500 microns is laminated to a metal sheet, and in a flat plate or roller pressing and heating manner, leather formed by natural fibers, man-made fibers, blend spinning and dermis is laminated on the other side of the sheet.

Disadvantage: the TPR cannot be laminated to the EVA foamed material, and moreover the process required heating by an oven, the procedure is long, and too much energy was consumed.

6. TW Patent Applicant No. 102110171

Approach: the invention provides a hot melt adhesive highly favorable to environmental protection, which has sufficient pressure-sensitive adhesion, adhesive force and thermal stability.

Disadvantage: the peeling strength is less than 1 kgf/cm, a film shape is not formed, and no particular production method is provided.

Based on the foregoing analysis, it is necessary to provide a high adhesion composite film and manufacturing method thereof, so as to solve the foregoing deficiencies in the prior art.

SUMMARY OF THE INVENTION

In accordance with one aspect of the present disclosure, a high adhesion composite film includes a thermoplastic elastomer layer and a modified adhesive layer. The thermoplastic elastomer layer includes a first surface and a second surface, and the second surface is opposite to the first surface. The modified adhesive layer is disposed on the first surface of the thermoplastic elastomer layer.

In accordance with another aspect of the present disclosure, a manufacturing method of a high adhesion composite film includes step in which a first raw material and a second raw material are provided, wherein the first raw material is used to fabricate a thermoplastic elastomer layer, and the second raw material is used to fabricate a modified adhesive layer. The manufacturing method continues with step in which the first raw material and the second raw material are co-extruded to form the high adhesion composite film including the thermoplastic elastomer layer and the modified adhesive layer.

In the present disclosure, the high adhesion composite film is manufactured by co-extruding the thermoplastic elastomer layer and the modified adhesive layer, so that the adhesion strength of the composite film can be enhanced significantly. Furthermore, the present disclosure can manufacture the high adhesion composite film without the use of solvents, which meets the requirements of environmental protection.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
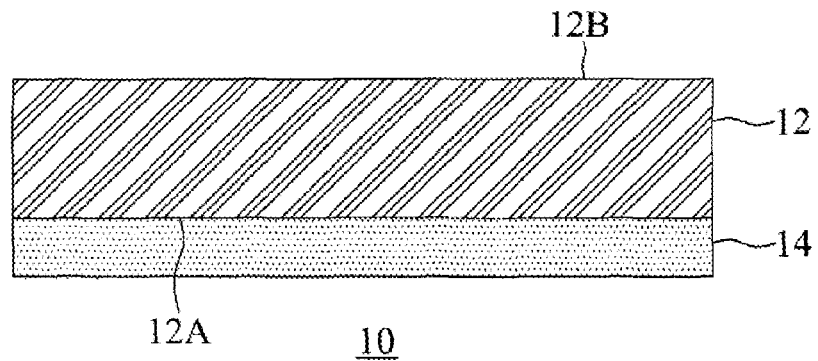
FIG. 1 is a schematic structural view of a high adhesion composite film according to the present disclosure.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic structural view of a high adhesion composite film according to the present disclosure.

Referring to FIG. 1, the high adhesion composite film 10 of the present disclosure includes a thermoplastic elastomer layer 12 and a modified adhesive layer 14.

The thermoplastic elastomer layer 12 includes a first surface 12A and a second surface 12B. The second surface 12B is opposite to the first surface 12A. In some embodiments, the thermoplastic elastomer layer 12 is one selected from the following: an ester-based thermoplastic elastomer, an amide-based thermoplastic elastomer, an ethylene-based thermoplastic elastomer, a melt-processible thermoplastic elastomer, a styrene-based thermoplastic elastomer, an olefin-based thermoplastic elastomer, a diene-based thermoplastic elastomer, a vinyl chloride-based thermoplastic elastomer and a urethane-based thermoplastic elastomer. Preferably, the thermoplastic elastomer layer 12 is a thermoplastic polyurethane elastomer or a thermoplastic polyester elastomer. In addition, preferably, the thickness of the thermoplastic elastomer layer 12 is 0.025 to 1.5 mm inclusive, and the optimum thickness is 0.1 to 0.2 mm inclusive.

The modified adhesive layer 14 is disposed on the first surface 12A of the thermoplastic elastomer layer 12, and preferably, the modified adhesive layer 14 is a thermoplastic elastomer modified polymer. In some embodiments, the thermoplastic elastomer modified polymer is a mixture of a thermoplastic elastomer and a polymer, the thermoplastic elastomer is a thermoplastic polyurethane elastomer, and the polymer is one selected from the following: a maleic acid anhydride-based polymer, a carboxylic polymer, an acetate-based polymer, a maleic acid-based polymer, an amine-based polymer, an imide-based polymer, an alkoxy silicon-based polymer, a silanol-based polymer, a silyl ether-based polymer, a hydroxyl-based polymer and an epoxy-based polymer. Preferably, a weight mixing ratio of the thermoplastic elastomer and the polymer is 9:1 to 1:9 inclusive. In addition, preferably, the thickness of the modified adhesive layer 14 is 0.025 to 1.5 mm inclusive, and the optimum thickness is 0.1 to 0.2 mm inclusive.

Furthermore, preferably, the high adhesion composite film 10 has a film thickness of 0.05 to 2.0 mm inclusive, and the optimum film thickness is 0.2 to 0.5 mm.

Figure 2:
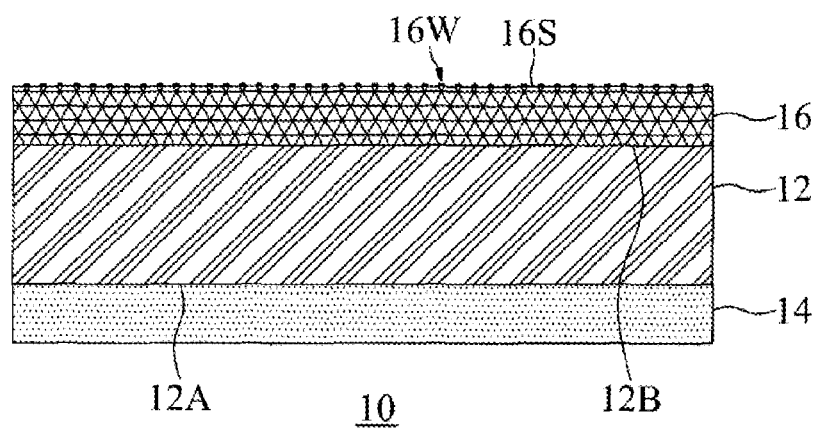
FIG. 2 is another schematic structural view of the high adhesion composite film according to the present disclosure.

FIG. 2 is another schematic structural view of the high adhesion composite film according to the present disclosure.

Referring to FIG. 2, in another embodiment, the high adhesion composite film 10 can further include a resin coating 16. The resin coating 16 is disposed on the second surface 12B of the thermoplastic elastomer layer 12. Preferably, the resin coating 16 has at least one color, and moreover the resin coating 16 includes a surface 16S and a grain structure 16W. The grain structure 16W is formed on the surface 16S.

Figure 3:
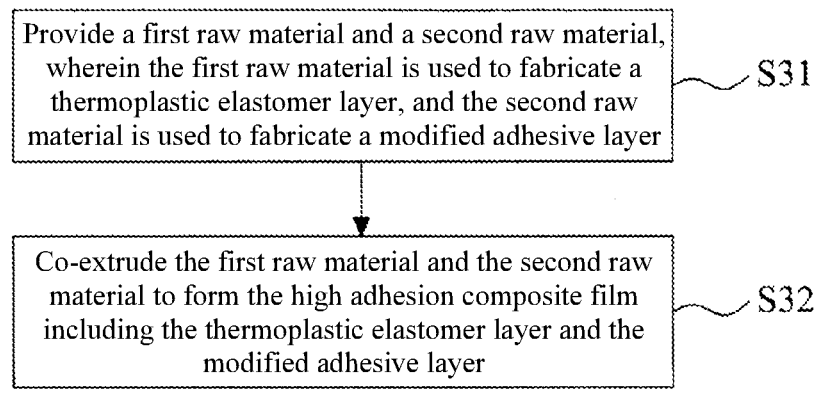
FIG. 3 is a flow diagram of a manufacturing method of a high adhesion composite film according to the present disclosure.
Figure 4:
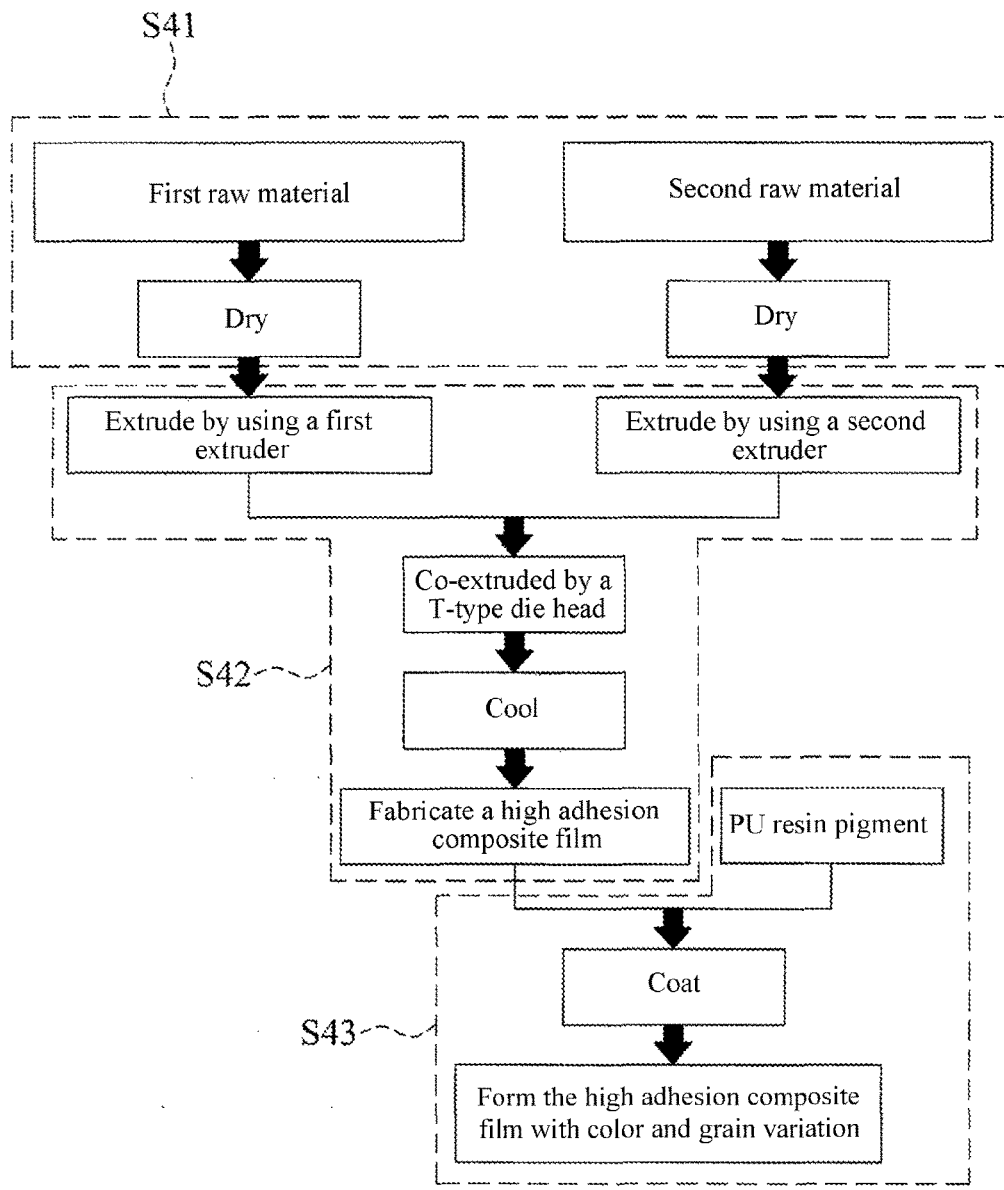
FIG. 4 is a schematic view of a manufacturing process of a high adhesion composite film according to the present disclosure.

FIG. 3 is a flow diagram of a manufacturing method of a high adhesion composite film according to the present disclosure. FIG. 4 is a schematic view of a manufacturing process of a high adhesion composite film according to the present disclosure.

With reference to step S31 of FIG. 3, step S41 of FIG. 4 and FIG. 1, a first raw material and a second raw material are provided, wherein the first raw material is used to fabricate a thermoplastic elastomer layer 12, and the second raw material is used to fabricate a modified adhesive layer 14. In this step, the first raw material is one selected from the following: an ester-based thermoplastic elastomer, an amide-based thermoplastic elastomer, an ethylene-based thermoplastic elastomer, a melt-processible thermoplastic elastomer, a styrene-based thermoplastic elastomer, an olefin-based thermoplastic elastomer, a diene-based thermoplastic elastomer, a vinyl chloride-based thermoplastic elastomer and a urethane-based thermoplastic elastomer. Preferably, the first raw material is a thermoplastic polyurethane elastomer or a thermoplastic polyester elastomer.

In this step, the second raw material is a thermoplastic elastomer modified polymer, and the thermoplastic elastomer modified polymer is a mixture of a thermoplastic elastomer and a polymer. The thermoplastic elastomer is a thermoplastic polyurethane elastomer. The polymer is one selected from the following: a maleic acid anhydride-based polymer, a carboxylic polymer, an acetate-based polymer, a maleic acid-based polymer, an amine-based polymer, an imide-based polymer, an alkoxy silicon-based polymer, a silanol-based polymer, a silyl ether-based polymer, a hydroxyl-based polymer and an epoxy-based polymer. Preferably, a weight mixing ratio of the thermoplastic elastomer and the polymer is 9:1 to 1:9 inclusive.

Furthermore, in order to reduce the moisture content of the first raw material and the second raw material, this step can further include drying the first raw material and the second raw material.

With reference to step S32 of FIG. 3, step S42 of FIG. 4 and FIG. 1, the first raw material and the second raw material are co-extruded, so as to form the high adhesion composite film 10 including the thermoplastic elastomer layer 12 and the modified adhesive layer 14. In this step, the first raw material and the second raw material are extruded by a first extruder and a second extruder respectively, and then are co-extruded through a T-type die head and cooled, to obtain the high adhesion composite film 10.

With reference to step S43 of FIG. 4 and FIG. 2, in order to make the high adhesion composite film 10 have a color variation, in some embodiments, a resin coating 16 can be formed on the thermoplastic elastomer layer 12. Preferably, the resin coating 16 is a PU resin pigment, and the resin coating 16 has at least one color. In addition, the resin coating 16 can be formed on the thermoplastic elastomer layer 12 through coating. Or, in another embodiment, the resin coating 16 can be formed on the thermoplastic elastomer layer 12 through lamination.

Furthermore, in some embodiments, a grain structure 16W can also be formed on a surface 16S of the resin coating 16, so that the high adhesion composite film 10 has a grain variation.

In the present disclosure, the high adhesion composite film 10 is manufactured by co-extruding the thermoplastic elastomer layer 12 and the modified adhesive layer 14, so that the adhesion strength of the composite film can be enhanced significantly. Furthermore, the present disclosure can manufacture the high adhesion is composite film 10 without the use of solvents, which meets the requirements of environmental protection. Moreover, the present disclosure can also simplify the manufacturing process, thereby reducing energy consumption in the process.

Embodiment

Raw Material:
1. Thermoplastic polyurethane elastomer: shoe A was 70 A, and Tm was 118° C.
2. Maleic anhydride functional particles: the effective concentration was 40%.

Drying:
1. A drying temperature of the thermoplastic polyurethane elastomer was 60° C., and the time was 4 hours or more, so as to reduce the moisture content to below 300 ppm.
2. A drying temperature of the maleic anhydride functional particles was 50° C., and the time was 4 hours or more, so as to reduce the moisture content to below 300 ppm.

Proportion of Formula:
1. 100% thermoplastic polyurethane elastomer was used as a first raw material, to be put into a first extruder.
2. 60% thermoplastic polyurethane elastomer and 40% maleic anhydride functional particles were mixed to be used as a second raw material, to be put into a second extruder.

Temperature Setting of Extruders:
1. The first extruder had four heating zones, and the heating temperature range was 100° C. to 250° C. inclusive.
2. The second extruder had four heating zones, and the heating temperature range was 100° C. to 250° C. inclusive.

Temperature setting of T-type die head:
1. The die head had 16 heating zones, and the heating temperature range was 100° C. to 250° C. inclusive.

Setting of throughput:
1. The screw rotation speed of the first extruder was 20 rpm.
2. The screw rotation speed of the second extruder was 20 rpm.

Lamination:
1. Release paper or polypropylene synthetic paper (PP film) was used to perform lamination at a laminating rate of 6 M/min, and the composite film had a total thickness of 0.6 mm.
2. The temperature of a lamination wheel was 10° C.

High adhesion composite film:
After lamination, a double-layer high adhesion composite film was obtained.

Fabrication of surface layer:
1. Aqueous or oily PU (Polyurethane) resin was mixed with a toner or color paste to fabricate a PU resin pigment. A continuous dry coating machine was then used to coat the PU resin pigment on a release paper having grains. The release paper was dried by a first oven. After drying was completed, an aqueous or oily paste was coated, and then the release paper was semi-dried by a second oven.
2. The PU resin coating and the high adhesion composite film were pressurized and laminated, then the release paper was removed, and the high adhesion composite film whose surface had color and grain variations was obtained.

Table 1 and Table 2 respectively show test results of the peeling strength of the high adhesion composite film laminated to metal and an EVA foamed material. As shown in Table 1 and Table 2, after a single-layer thermoplastic elastomer is laminated to the metal and the EVA foamed material, the peeling strength is too low and cannot be measured by a machine. However, after the high adhesion composite film of the present disclosure is laminated to the metal and the EVA foamed material, the peeling strength is significantly improved, proving that the high adhesion composite film of the present disclosure indeed has the effect of improving the adhesion strength.

TABLE 1

Test results of the peeling strength of the high adhesion composite film laminated to metal

| | | Flat-bed press-laminate metal | | | | |
|---|---|---|---|---|---|---|
| Name | Temperature (° C.) | 125 | 135 | 145 | 155 | 165 |
| Embodiment | Peeling strength (kgf/cm) | 2.2 | 3.07 | 5.27 | 4.47 | 5.79 |
| Thermoplastic elastomer | Peeling strength (kgf/cm) | X | X | X | X | X |

X: The strength is too low and cannot be measured by a machine.

TABLE 2

Test results of the peeling strength of the high adhesion composite film laminated to an EVA foamed material

| | | Flat-bed press-laminate EVA foamed material |
|---|---|---|
| Name | Temperature (° C.) | 135 |
| Embodiment | Peeling strength (kgf/cm) | 3.8 (broken) |
| Thermoplastic elastomer | Peeling strength (kgf/cm) | X |

X: The strength is too low and cannot be measured by a machine.
Broken: Due to insufficient strength, the material (EVA foamed material) self-ruptures.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A high adhesion composite film, comprising:
   a thermoplastic elastomer layer including a first surface and a second surface, and the second surface is opposite to the first surface;
   a modified adhesive layer disposed on the first surface of the thermoplastic elastomer layer, wherein the modified adhesive layer is a thermoplastic elastomer modified polymer; the thermoplastic elastomer modified polymer is a mixture of a thermoplastic elastomer and a polymer, and the polymer is a maleic acid anhydride-based polymer and a weight mixing ratio of the thermoplastic elastomer and the polymer is 9:1 to 1:9 inclusive; and
   a resin coating disposed on the second surface of the thermoplastic elastomer layer, wherein the resin coating is a PU resin pigment,
   wherein the thermoplastic elastomer layer is a thermoplastic polyurethane elastomer, and the thermoplastic polyurethane elastomer has a moisture content below 300 ppm,
   wherein the maleic acid anhydride-based polymer is made of maleic anhydride functional particles, and the maleic anhydride functional particles have a moisture content below 300 ppm.

2. The high adhesion composite film of claim 1, wherein the thickness of the thermoplastic elastomer layer is 0.025 to 1.5 mm inclusive.

3. The high adhesion composite film of claim 1, wherein the thermoplastic elastomer is a thermoplastic polyurethane elastomer.

4. The high adhesion composite film of claim 1, wherein the thickness of the modified adhesive layer is 0.025 to 1.5 mm inclusive.

5. The high adhesion composite film of claim 1, having a film thickness of 0.05 to 2.0 mm inclusive.

6. The high adhesion composite film of claim 1, wherein the resin coating includes a surface and a grain structure, and the grain structure is formed on the surface.

7. The high adhesion composite film of claim 1, wherein the resin coating has at least one color.

* * * * *